Patented Apr. 24, 1923.

1,452,781

UNITED STATES PATENT OFFICE.

FREDERICK M. BECKET, OF NIAGARA FALLS, NEW YORK, ASSIGNOR TO UNION CARBIDE & CARBON RESEARCH LABORATORIES, INC., A CORPORATION OF NEW YORK.

WELDING ROD.

No Drawing.     Application filed June 28, 1921. Serial No. 481,078.

*To all whom it may concern:*

Be it known that I, FREDERICK M. BECKET, a citizen of the United States, residing at Niagara Falls, in the county of Niagara and State of New York, have invented certain new and useful Improvements in Welding Rods, of which the following is a specification.

This invention relates to processes wherein metal is fused by the electric arc or the blowpipe and flowed into contact with heated solid metal for the purpose of welding, filling, coating or the like. More particularly, the invention relates to the composition of the metal added in such operations.

When ordinary carbon steel, in the form of a rod or the like, is used as the metal to be fused and added, it is found that the results leave much to be desired. The iron and manganese of the molten metal oxidize and the oxids so formed are reduced in part by the carbon present, with the formation of gaseous products. Two detrimental effects are thus produced. The gaseous carbon-oxygen compounds form blowholes in the weld, reducing its strength, and a considerable but indefinite amount of the strengthening element carbon is removed from the weld.

The object of my invention is to overcome these defects and to provide a welding alloy which will produce better welds, while permitting higher welding speeds and making the welding process less dependent on the skill of the operator.

These objects are attained by incorporating manganese and silicon into the welding metal, the effect of the silicon being especially noticeable. Silicon is readily oxidized during welding, but a decreased silicon content does no harm. The oxid (silica) formed, combines with oxids of iron and manganese, producing fusible silicates, which form a thinly-fluid slag at the welding temperature. This slag forms a layer over the heated metal, effectually preventing its oxidation as well as the absorption of nitrogen therein. The protective layer of slag as well as the presence of substantial quantities of the strongly reducing elements—manganese and silicon—decrease oxidation of the carbon and hence tend to prevent the formation of gases in the metal or a decrease in the carbon content. A higher welding temperature, permitting greater welding speed, is made possible, as the protective action above noted keeps down the oxidation even with elevated temperatures. In addition, the silicon renders the welding metal more fusible and more fluid at the welding temperature, and these factors within limits favor better welds and greater speed.

The manganese content of the welding metal may be from 0.50% to 1.75% and the silicon from 0.3% to 1.50%. Carbon may vary from 0.05% to 0.50%. Excellent results have been obtained with manganese between 0.80% and 1.0% and silicon between 0.50% and 0.75%. In one instance which illustrates the advantageous features of the invention, a rod of steel containing 0.15% carbon, 0.76% manganese and 0.65% silicon, was used as welding metal. The weld has excellent physical properties. The manganese in the weld had reduced itself to 0.61% and the silicon to 0.42%, but there had been no loss of carbon. In general, however, with a rod of the composition noted, there will be a slight but practically negligible loss of carbon during the welding operation.

I have found that the percentage of manganese present is preferably greater than the percentage of silicon. The best results appear to follow when the percentage of manganese bears to the percentage of silicon a ratio of approximately 3:2. Under these conditions the welding metal flows freely but is not excessively fluid. When the metal is too fluid, the welder has difficulty in controlling it. However, my invention is not limted to this proportion, as improved welds may be obtained with the manganese and silicon in other proportions.

Alloys prepared in accordance with my invention may be formed into rods or pencils and used as electrodes or with the blowpipe. Methods of forming and using rods of this character and of adjusting their size in accordance with the purpose for which they are to be used are well understood in the art, and no modification of these methods is necessitated by the novel compositions herein described.

I claim:

1. A welding rod or the like consisting of an iron alloy containing carbon and substantial amounts of manganese and silicon.

2. A welding rod or the like consisting of an iron alloy containing carbon, more than 0.5% of manganese and more than 0.3% of silicon.

3. A welding rod or the like consisting of an iron alloy containing: carbon 0.05% to 0.5%, manganese 0.5% to 1.75%, and silicon 0.3% to 1.5%.

4. A welding rod or the like consisting of an iron alloy containing: carbon 0.05% to 0.5%, manganese 0.5% to 1.75% and silicon 0.3% to 1.5%, the manganese being present in substantially greater quantity than the silicon.

5. A welding rod or the like consisting of an iron alloy containing: carbon 0.05% to 0.5%, manganese 0.5% to 1.75%, and silicon 0.3% to 1.5%, the percentages of manganese and silicon present being approximately in the ratio of 3 to 2.

6. A welding rod or the like consisting of an iron alloy containing: carbon 0.05% to 0.5%, manganese 0.8% to 1.0%, and silicon 0.5% to 0.75%.

7. A welding rod or the like consisting of an iron alloy containing: carbon 0.05% to 0.5%, manganese 0.8% to 1.0% and silicon 0.5% to 0.75%, the percentages of manganese and silicon present being approximately in the ratio of 3 to 2.

In testimony whereof, I affix my signature.

FREDERICK M. BECKET.